Figure 1:
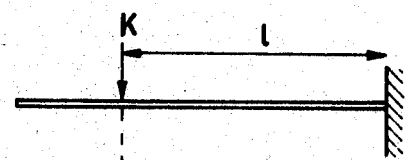

INVENTOR.
WILLEM H. KOOMAN

May 30, 1967  W. H. KOOMAN  3,321,964
DYNAMOMETER PICK-UP
Filed Sept. 8, 1964  2 Sheets-Sheet 2

INVENTOR.
WILLEM H. KOOMAN
BY
AGENT

United States Patent Office 3,321,964
Patented May 30, 1967

3,321,964
DYNAMOMETER PICK-UP
Willem Hermanus Kooman, Emmasingel, Eindhoven, Netherlands, assignor to North American Philips Company, Inc., New York, N.Y., a corporation of Delaware
Filed Sept. 8, 1964, Ser. No. 394,766
Claims priority, application Netherlands, Sept. 13, 1963, 297,912; Aug. 7, 1964, 6,409,067
10 Claims. (Cl. 73—141)

The invention relates generally to force measuring instruments and in particular to a dynamometer pick-up comprising a resilient body on which a number of measuring elements are arranged, for example, strain gauges which are interconnected in a Wheatstone bridge circuit. The electric output of the strain gauges is a measure of the deformation occurring in the resilient body at the places where the measuring elements are located.

Force measuring devices are known in which the resilient body is subjected to bending forces. There are thus produced moments M in the pressure body. The values of the moments are determined by the product of the force K to be measured and the distance $l$ between the point of application of the force K and the measuring place of the moment, so that $M=Kl$. Owing to the bending in a cross-section of the resilient body, one side is subjected to compressive forces and the opposite side is subjected to tensile forces. By arranging the measuring elements at these opposite places each on either side of an imaginary line of bending, the influences of the non-linearity of the elasticity of the material of the resilient body and the nonlinearity of the measuring elements are compensated to a considerable extent.

These devices have the disadvantage that the measuring result is in part determined by the point of application of the force on the resilient body. Consequently, the force K to be measured can be derived from the moment M only when the distance $l$ is known. In practice this is not desirable. For example, when loads are to be measured and the exact location of the load on the weighing system, i.e. the point of application of the force K, is not accurately determined. The invention has for an object to mitigate this disadvantage by means of a simple device. The invention consists in that the points of application of the forces are located on one line, whilst the resilient body is formed by limbs lying between said points of application, said limbs extending each on one side of said line, whilst measuring elements for measuring said moments are arranged pairwise on each side of the said line on parts of the resilient body where moments of opposite sign occur.

Figure 3:
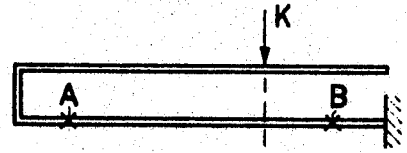
Figure 4:
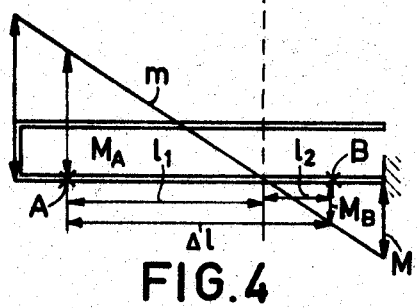
Figure 5:
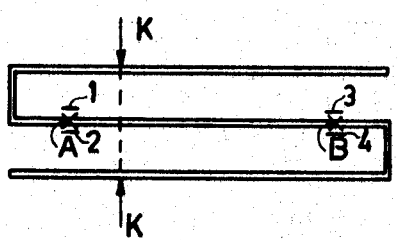
Figures 5A, 6:
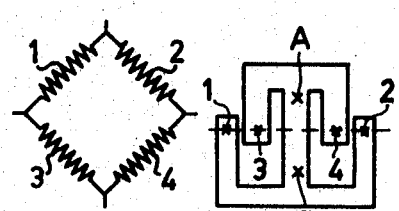
Figure 7A:
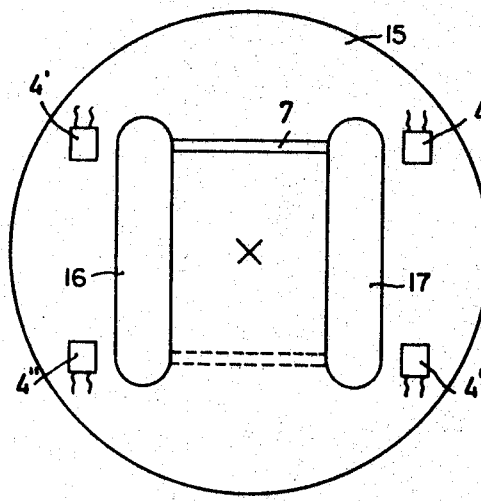
Figure 7B:
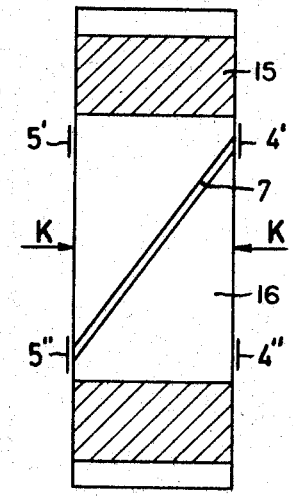
Figure 8A:
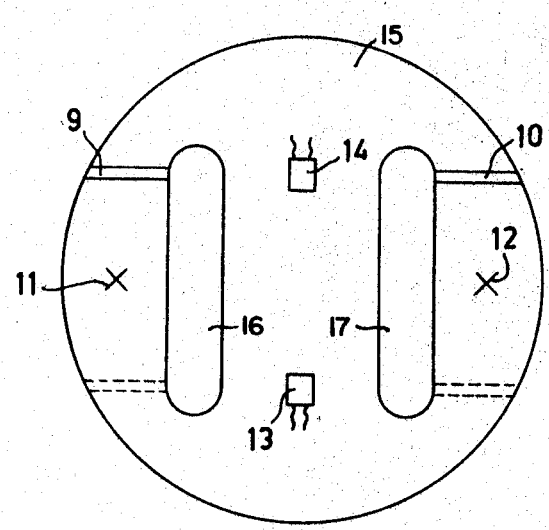
Figure 8B:
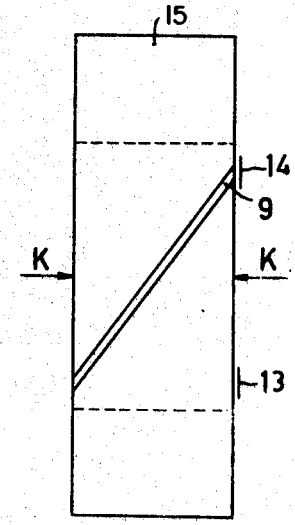

The invention will be described more fully with reference to the drawing, in which:

FIGS. 1 to 4 show clamped end bars for explaining the principle of the invention and FIG. 5 shows a first embodiment, FIG. 6 a second, FIG. 7 a third and FIG. 8 a fourth embodiment of the invention.

Figure 2:
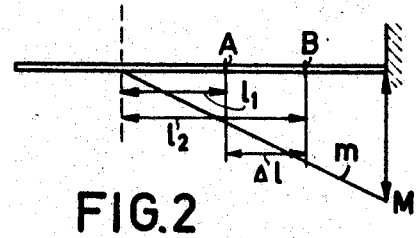

When a force to be measured is applied to a point on a bar clamped tight at one end (see FIG. 1), a counteracting moment is produced at each point on the bar between the point of clamping and the point of application of the force. The magnitude of said moment is the product of said force and the distance between the point of application of said force and the chosen point of the bar. The so-called line of moments $m$ is shown in FIG. 2. It indicates the magnitude of the counteracting moment at each point on the bar. At the point of clamping this moment is $M=Kl$ wherein K is the force and $l$ is the length of the bar between the point of application of the force and the point of clamping.

When this force K is applied to the upper side of the bar, this upper side is exposed between the point of application and the point of clamping to a tensile force and the lower side of the bar is under a compressive strain. When moments are measured at two places on said clamped bar, for example, at points A and B, the moment at point A is $M_A=Kl_1$ and the moment at B is $M_B=Kl_2$. In the invention use is made of the difference between said moments $M_B-M_A=K(l_2-l_1)=K\Delta l$. When the points A and B are fixed, the result is independent of the point between the free end and the point A at which the force K is applied, owing to the constant value of $\Delta l$. The force K is derived from the measuring result by dividing by the factor $\Delta l$. Thus the said disadvantage of the known device is obviated. However, by measuring the difference between said moments only a low measuring signal is obtained, so that the measurement may be inaccurate. Moreover, the point of clamping is heavily stressed, which requires a rigid structure.

The device according to the invention is constructed so that the measurement is composed of the sum of the moments, not the difference between the moments, so that a higher measuring signal is available. FIG. 3 shows a first example. The force is applied to the upper side of the bar which is clamped at one end and the force is transferred to the bar by means of a limb formed here by a bend to the left-hand side. As a result, on the left-hand side of a vertical line going through the point of application of the force, a part of the resilient body is obtained, the upper side of which is under strain of compression and the lower side of which is under strain of tension, whereas the right-hand part is under strain of tensile forces and the lower side is under strain of compressive force. The moments are termed here negative and positive respectively, which is indicated in FIG. 4, which shows the lines of moments $m$ of the bar.

At two points A and B of the bar, on either side of the said vertical line, the moments are measured. Point A provides a negative moment $-M_A$ and point B a positive moment $+M_B$. In the bridge circuit the difference between said moments is measured, i.e.

$$M_B-(-M_A)=M_B+M_A=Kl_1+Kl_2=K\Delta l$$

The measured moment is thus again independent of the place where the force is applied to the upper side, when the value of $\Delta l$ is fixed. The disadvantage of this arrangement is that at the point of clamping a great moment appears in the event of heavy loads, so that the structural requirements at this point are severe. Therefore, on the right-hand side of the vertical line going through the point of application of the force there is provided, in accordance with the invention, a further limb, formed here by a right-hand bend, so that just beneath the point of application of the force there is formed a supporting point which provides the counter force. This is illustrated in FIG. 5. The moments measured at points A and B of the bar are the same as those illustrated in FIGS. 3 and 4.

FIG. 5 shows an embodiment of the invention in which measuring elements are arranged at the points A and B on the upper side and on the lower side of the bar, for example, strain gauges 1, 2, 3 and 4. The strain gauges are included in known manner in a bridge circuit as shown in FIG. 1a. Instead of using resistance strain gauges, measuring elements responding to capacitance variations may also be used. Other variants may be proposed in which the points of application of the forces are always located on one line, whilst on either side of said line going through said points of application moments of opposite sign can be measured on limbs of the structure. A further embodiment is shown in FIG. 6. In this case the force to be measured is applied through a bridge to the points 3 and 4, whereas the points 1 and 2 constitute the supporting points. At points A and B on either side of line going through the points 1, 2, 3 and 4, the moments are measured by means of strain gauges or other measuring elements arranged on the upper side and on the lower side of the bar.

FIG. 7 shows an embodiment in which the height of the structure shown in FIG. 5 is reduced by a special construction. Particularly for measuring heavy forces this may be important, since the height of the structure is not enlarged by the thickness of the limbs of the resilient body.

FIG. 7a is a plan view and FIG. 7b is a side elevation and partially a sectional view of said embodiment. Reference numeral 15 designates a flat, steel body, which may have a cylindrical shape and which is provided with two symmetrical openings 16 and 17, extending in the axial direction. The openings communicate with each other through a narrow air gap 7, which may be at an angle of 45° to the upper and the lower faces. The force K is operative along an axis passing through the resilient body. The resilient body is under strain of bending forces and the greater bending moments appear in the section between one of the openings 16 and 17 and the edges of the resilient body, which are preferably flattened in order to obtain a constant resistance moment. At these points strain gauges 4, 5 are fastened to the upper side and to the lower side of the body, said gauges being included in known manner in an electric bridge circuit in order to obtain an electrical voltage proportional to the force K.

FIG. 7b shows that the applied force K subjects the strain gauges 4' to tensile force and the strain gauges 5', on the contrary, to compression. Conversely, the strain gauges 4" are under a compressive strain and the strain gauges 5" under strain of tensile force. As in the embodiments described above the measured moments are again added to each other and the point of application of the force K does not affect the measuring results.

In the device shown in FIG. 8 two gaps 9 and 10 are provided also at angles of about 45° to the lower and the upper faces of the resilient body. They are located in the same flat plane. The measured force is distributed by U-shaped yokes (not shown) among the points of application 11 and 12, where consequently a part of the force applies. The resilient body is again under strain of bending forces and the greater bending moments appear in sectional areas at the ends of the central portion between the openings. At these points the strain gauges 13 and 14 are fastened. It is to be preferred to fasten two strain gauges on the upper side and two on the lower side. The gauges are then included in the four arms of the bridge circuit.

The two gaps may also be located in planes intersecting each other at an angle of 90°. In this case the body 15 is under strain of torsional forces and the greater torsional moment will be located centrally between the openings. The strain gauges are then fastened in the central sectional area at an angle of 45° to the upper face and to the lower face.

What is claimed is:

1. A force measuring device comprising a flat body having a pair of end faces, said body being arranged so that a load force is applied thereto at first and second points on said end faces which define a single line through said body, said body having two substantially symmetrical holes and a slot formed therein and extending therethrough, said holes being on opposite sides of said single line and said slot extending obliquely through the body from one end face to the other end face and interconnecting said holes at each end face and at all points therebetween, a plurality of strain responsive transducer elements mounted on the end faces of said body in pairs at points on either side of said line where moments of opposite sign are produced by the load.

2. A device as described in claim 1 wherein said holes are in the shape of elongated slots having a long and a short cross-sectional dimension and in which the longer cross-sectional dimension of one slot is parallel to the corresponding dimension of the other slot.

3. A device as described in claim 1 wherein said transducer elements are mounted on said end faces at points located between said holes and the outer edges of the body.

4. A device as described in claim 1 wherein said end faces are parallel and said holes extend through said body from one end face to the other in a direction perpendicular to the end faces of the body and wherein said first and second points are located between said holes and said single line is perpendicular to said end faces.

5. A device as described in claim 4 wherein said body is in the form of a flat cylinder.

6. A force measuring device comprising a flat resilient body having a pair of parallel end faces and an axis perpendicular thereto, said body being arranged so that a load force is applied thereto at a first point on one end face and at a second point on the second end face which define a single force line through said body extending in a direction parallel to said axis, said body having two substantially symmetrical holes extending through said body in a direction generally parallel to said axis from one end face to the other, a slot in the body extending from one end face to the other in a direction oblique to said end faces and intersecting said holes at each end face and all points therebetween, said holes being on opposite sides of said force line and said slot obliquely intersecting said force line, a first pair of strain responsive transducer elements respectively mounted on said one and said second end faces at points on one side of said line at which bending moments of opposite sign are produced by the load, a second pair of strain responsive transducer elements respectively mounted on said one and said second end faces at points on the other side of said line at which bending moments of opposite sign are produced by the load.

7. A device as described in claim 6 wherein said holes comprise a pair of parallel arranged elongated slots symmetrically disposed relative to said axis and extending straight through said body.

8. A device as described in claim 7 wherein said transducer elements are mounted on said end faces at points located between said holes and the outer edges of the resilient body, and wherein the load force is applied to said end faces at points located between said holes and along a line that substantially coincides with said axis.

9. A device as described in claim 8 further comprising means for connecting said transducer elements in a Wheatstone bridge circuit.

10. A device as described in claim 6 wherein said oblique slot is arranged to intersect said end faces at an angle of approximately 45 degrees.

References Cited

UNITED STATES PATENTS

| | | | |
|---|---|---|---|
| 3,004,231 | 10/1961 | Laimins. | |
| 3,019,643 | 2/1962 | Curry | 73—88.5 X |
| 3,159,027 | 12/1964 | Curry | 73—141 X |
| 3,195,353 | 7/1965 | Pien | 73—88.5 X |

OTHER REFERENCES

German printed application No. 1,125,204, March 8, 1962.

RICHARD C. QUEISSER, *Primary Examiner.*

C. A. RUEHL, *Examiner.*